July 21, 1964
R. M. EDWARD, JR
3,141,937
APPLIANCE SWITCH STAND
Filed Dec. 9, 1960
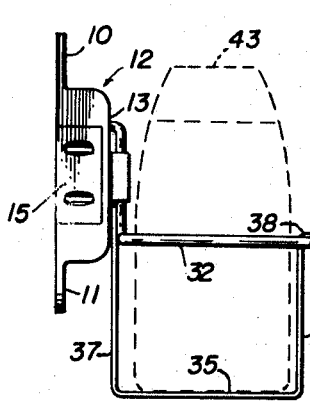
FIG. 1.
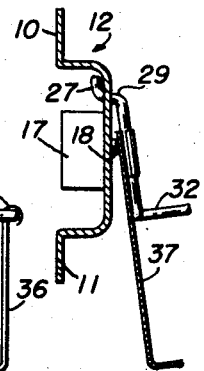
FIG. 3.
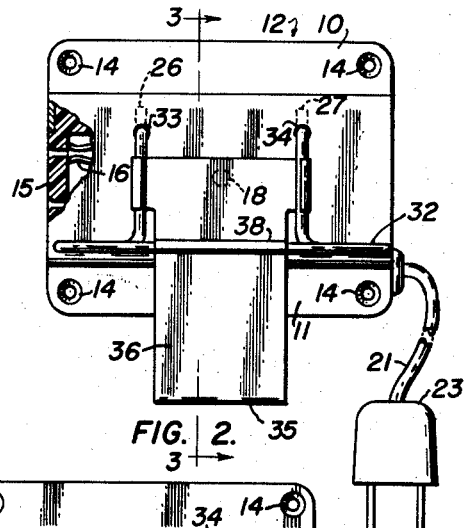
FIG. 2.
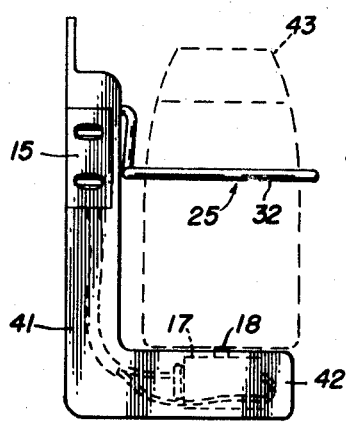
FIG. 4.
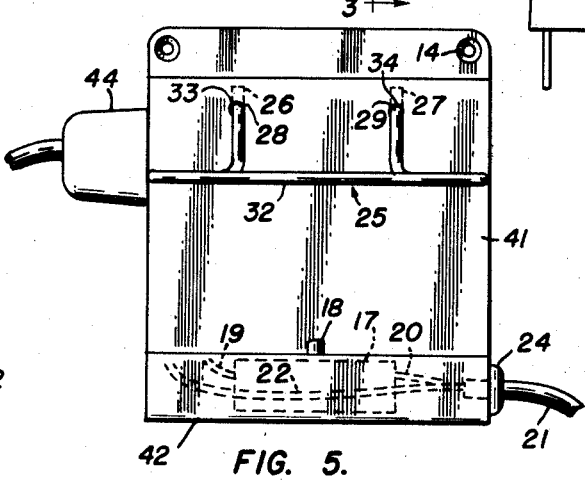
FIG. 5.
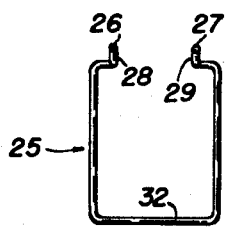
FIG. 8.
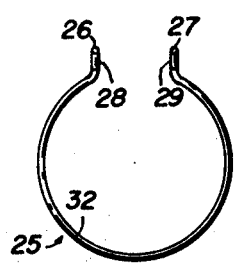
FIG. 7.
FIG. 6.
ROBERT M. EDWARD, JR.
INVENTOR.
BY /Herbert J. Brown/
ATTORNEY

United States Patent Office 3,141,937
Patented July 21, 1964

3,141,937
APPLIANCE SWITCH STAND
Robert M. Edward, Jr., Fort Worth, Tex.
(1405 W. Tucker Blvd., Arlington, Tex.)
Filed Dec. 9, 1960, Ser. No. 74,957
1 Claim. (Cl. 200—61.58)

This invention relates to switch stands and has reference to a demountable and bendable frame construction whereby appliances of various configurations may be supported for gravity operation of a biased electrical switch.

Frequently used electrical appliances, such as small drills, powered kitchen utensils, and electric razors derive much of their utility from compact construction and consequent amenability to storage near their point of use. Storage in an appliance stand having a coactive actuating switch incorporated therein enhances the convenience of such appliances by obviating the need for making electrical connection for each use and placing the appliance in operation by its removal from conveniently located receptacle. Unfortunately, the types and models of small electrical appliances are numerous and in some competitive fields the sizes and shapes of appliance housings are modified annually or bi-annually much as automotive body styles are changed in evolvement with public tastes. The difficulties of marketing a separate switch stand for each model of each appliance is apparent from the number of switch stands which a merchant would have to carry in stock to meet his customer's divergent requirements; an increase in manufacturing costs would likewise arise from the tooling required for the construction of differing switch stands in small quantities as opposed to construction of a few models in greater quantities.

An important object of the present invention is to provide a construction for one switch stand which will accommodate a plurality of appliances differing in size and shape.

Another object of the invention is to provide a construction for switch stands whereby hand modification of a frame member thereof will permit the switch stand to be used with any of a variety of appliances.

A further object of the invention is to provide a single and interchangeable frame member for a switch stand so that the same may be adapted for use with appliances of several ranges of size and shape.

Another object of the invention is to provide a conformable appliance switch stand having a single pressure operated switch therein and having an electrical socket wired in series with the pressure switch so that the appliance may be kept inactivated by its storage.

A particular object of the invention is to provide a switch stand having rigid parts supporting a pressure switch therein and having demountable and bendable parts confining an appliance to a fixed position with respect to said rigid parts.

These and other objects will become apparent from the following description and the accompanying drawing, wherein:

FIGURE 1 is a side elevational view of the invention showing a supported appliance in dotted lines.

FIGURE 2 is a front elevational view of the invention showing part of its forward wall removed to illustrate internal features of construction.

FIGURE 3 is a sectional view taken along line 3—3 in FIGURE 2.

FIGURE 4 is a side elevational view of an alternate form of construction of the invention and showing internal components as well as a supported appliance by dotted lines.

FIGURE 5 is a front elevational view of the form of the invention illustrated in FIGURE 4.

FIGURES 6 through 8 are reduced plan views of detachable and bendable frames of the invention shown in exemplary configurations to accommodate appliances of different shapes and sizes.

In the drawing, and with particular reference to that embodiment of the invention illustrated in FIGURES 1 through 3, coplanar upper and lower wall plates 10 and 11 are formed as flanges of an integrally constructed hollow chassis 12 having its forward wall 13 positioned forwardly of but parallel with the wall plates 10 and 11. Countersunk screw openings 14 are formed through the wall plates 10 and 11 at corners thereof and are adapted to receive screws (not shown) which secure the wall plates and chassis 12 to any suitable vertical surface. An electrical socket 15 is positioned within the chassis 12 and is mounted flush with an end wall thereof. The socket 15 includes conventional prong clips 16 adapted to bear upon and make electrical contact with the prongs of an electrical plug engaged thereby. A spring biased button type switch 17 is positioned within the chassis 12 and is supported by the forward wall 13 thereof with its actuating button 18 projecting through and forwardly of the forward wall of the chassis. The switch 17 is of the normally closed type and may be any of a number of commercially available varieties; microswitches characterized by low actuating pressures as well as limited armature travel have been found to be particularly suitable for use in the described construction. The switch 17 is wired in series with one of the contact points 16 of the socket 15 by electrical leads 19 and 20 which are wired, in turn, to one conductor of a conventional electrical cord 21. The other contact of the socket 15 is wired directly to the other conductor of the cord 21 by an electrical lead 22. The cord 21 extends exteriorly of the chassis 12 and is wired to an output plug 23; a grommet 24 surrounds the cord 21 at its passage through a wall of the chassis 12. A bendable frame generally designated by the numeral 25 is fabricated from a single bar of ductile metal, such as copper, and ends 26 and 27 of the frame are spaced from but parallel with one another. Offset portions 28 and 29 of the frame 25 are located equidistantly from the corresponding ends thereof and are disposed perpendicularly to the end portions and extend parallel with one another therefrom. Intermediate portions 30 and 31 of the frame 25 respectively form right angles with the offset portions 28 and 29 and extend in parallel relationship with one another from the offset portions in a direction opposite to but parallel with the end portions 26 and 27. The remainder of the frame 25 is formed as a perimetal member 32 which defines a plane beneath and parallel with the common plane of the offset portions 28 and 29 and which extends forwardly of the chassis 12. Circular openings 33 and 34 are formed in horizontal alignment with one another through the forward wall 13 of the chassis 12 and admit the end portions 26 and 27 to the interior of the chassis 12 where they bear against the inner surface of the forward wall of the chassis whereas the offset portions 28 and 29 of the frame 25 are held within and bear upon the openings 33 and 34.

In the preferred form of the invention a horizontal shelf 35 is positioned directly beneath and is suspended from the bendable frame 25. Forward and rear supporting members 36 and 37 of the shelf 35 are integrally constructed therewith and comprise vertical extensions thereof; the supporting members and shelf being constructed from a single T-shaped piece of sheet metal. The upper end 38 of the forward supporting member 36 is wrapped around or otherwise secured to the forwardmost portion of the frame 25 and laterally extending members 39 and 40 at the upper end of the rear supporting member 37 similarly engage the intermediate portions 30 and 31 of the frame.

In the alternate form of construction, FIGURES 4 and 5, a chassis 41 is formed in the shape of an L with the lower portion 42 thereof projecting forwardly of the wall and extending beneath the frame 25. The switch 17, in this embodiment of the invention, is positioned within the lower portion 42 of the L-shaped chassis 41 and is attached to the upper wall thereof with its actuating button 18 projecting vertically therethrough. In this form of the invention the previously described shelf 35 and its supporting members 36 and 37 are omitted, and an appliance positioned within the frame 25 bears directly upon the actuating button 18 of the switch 17. FIGURES 6, 7 and 8 show typical configurations for the lower portion of the frame 25, it being understood that these configurations may be formed or modified by hand to permit the bendable frame to receive a variety of appliances. It is also to be understood that the end portions 26 and 27, offset portions 28 and 29 and intermediate portions 30 and 31 of the frame may be preformed by machine and that frames of differing perimetal dimensions may be provided with each chassis and may be interchangeably mounted thereon.

In operation, weight exerted by an appliance 43 is transmitted to the actuating button 18 of the switch 17 and interrupts the circuit thereof. The outlet plug 23 is inserted in any nearly convenient outlet, and the appliance plug 44 is received by the socket 15 in the chassis 12. When the appliance 43 is lifted from the frame 25 the circuit of the switch 17 is closed and current flows from a convenience outlet through the outlet plug 23 and switch 17 and appliance plug 44 to the appliance. Reinsertion of the appliance 43 into the frame 25 interrupts circuit of the switch 17 and the appliance 43 is turned off. In the preferred form of the invention it is necessary that the biasing pressure of the actuating button 18 of the switch 17 be sufficient to force the frame 25 and shelf 35 forward when the appliance 43 is removed therefrom. In the alternate form of the invention it is only necessary that the weight of the appliance 43 be sufficient to depress the actuating button 18 of the switch 17. The bendable frame 25 provides lateral support for an appliance positioned upon the switch stand and permits the same to receive appliances of varying size and shape.

The invention is not limited to the exemplary construction herein shown and described, but may be made in various ways within the scope of the appended claim.

What is claimed is:

An appliance stand comprising: a chassis, an electrical socket connected to said chassis and adapted to receive the plug of an electrical appliance, an electrical cord extending exteriorly of said chassis and including a plug electrically connected through said cord to said socket, appliance supporting means on said chassis, a normally closed button type switch positioned within said chassis and wired in series with said cord and having its actuating button projecting exteriorly of said chassis at a position responsive to the support of an appliance by said appliance supporting means, a ductile frame demountably attached to said chassis and adapted to receive an appliance therethrough with a portion of said frame substantially laterally adjacent an appliance when the same is supported by said appliance supporting means, and a shelf positioned beneath and attached to and supported by said ductile frame.

References Cited in the file of this patent
UNITED STATES PATENTS

| | | |
|---|---|---|
| 1,930,673 | Consolazio | Oct. 17, 1933 |
| 2,196,786 | Wahl | Apr. 9, 1940 |
| 2,248,513 | Riley | July 8, 1941 |
| 2,339,495 | McMann | Jan. 18, 1944 |
| 2,425,790 | Fletcher | Aug. 19, 1947 |
| 2,471,919 | Alfisi | May 31, 1949 |
| 2,474,899 | Hutt | July 5, 1949 |
| 2,475,404 | Reed | July 5, 1949 |
| 2,524,161 | Carp | Oct. 3, 1950 |
| 2,886,793 | Katzman et al. | May 12, 1959 |
| 2,911,490 | McKemie | Nov. 3, 1959 |